United States Patent
Kimura

(10) Patent No.: US 11,849,082 B2
(45) Date of Patent: Dec. 19, 2023

(54) IMAGE PROCESSING APPARATUS, CONTROL METHOD THEREFOR, AND MEDIUM

(71) Applicant: Canon Kabushiki Kaisha, Tokyo (JP)

(72) Inventor: Tomohiro Kimura, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/166,557

(22) Filed: Feb. 9, 2023

(65) Prior Publication Data

US 2023/0283721 A1    Sep. 7, 2023

(30) Foreign Application Priority Data

Feb. 14, 2022   (JP) ................ 2022-020795

(51) Int. Cl.
*H04N 1/60*       (2006.01)
*H04N 1/00*       (2006.01)
*G06F 21/60*      (2013.01)

(52) U.S. Cl.
CPC ....... *H04N 1/00005* (2013.01); *G06F 21/606* (2013.01); *H04N 1/00042* (2013.01); *H04N 1/00074* (2013.01); *H04N 1/00082* (2013.01); *H04N 1/0097* (2013.01)

(58) Field of Classification Search
CPC ........... H04N 1/00005; H04N 1/00042; H04N 1/00074; H04N 1/00082; H04N 1/0097; G06F 21/606
See application file for complete search history.

(56) References Cited

U.S. PATENT DOCUMENTS

| | | | |
|---|---|---|---|
| 2003/0223363 A1* | 12/2003 | Sato .............. | H04N 1/4413 370/230 |
| 2009/0002743 A1* | 1/2009 | Park .............. | G06K 15/02 358/1.14 |
| 2010/0235500 A1* | 9/2010 | Shizuno ......... | H04L 12/12 709/224 |
| 2011/0191631 A1* | 8/2011 | Suzuki ........... | G06F 11/07 714/25 |
| 2011/0191817 A1* | 8/2011 | Oh ................ | G06F 21/608 726/1 |
| 2013/0159743 A1* | 6/2013 | Inoue ............. | H04N 1/00896 713/320 |
| 2016/0026786 A1* | 1/2016 | Thomas .......... | G06F 21/32 726/27 |
| 2019/0356697 A1* | 11/2019 | Chougule ....... | G06F 9/45558 |

FOREIGN PATENT DOCUMENTS

JP    2007185814 A    7/2007

* cited by examiner

*Primary Examiner* — Moustapha Diaby
(74) *Attorney, Agent, or Firm* — Venable LLP

(57) ABSTRACT

An image processing apparatus is provided. The apparatus sets a first security setting for the image processing apparatus as a security setting of the image processing apparatus, monitors packets transmitted and received by the image processing apparatus, and provides a notification relating to a need to change the security setting when a packet with a result from monitoring via the monitoring matching a predetermined condition is found, wherein the predetermined condition is associated with the first security setting.

14 Claims, 9 Drawing Sheets

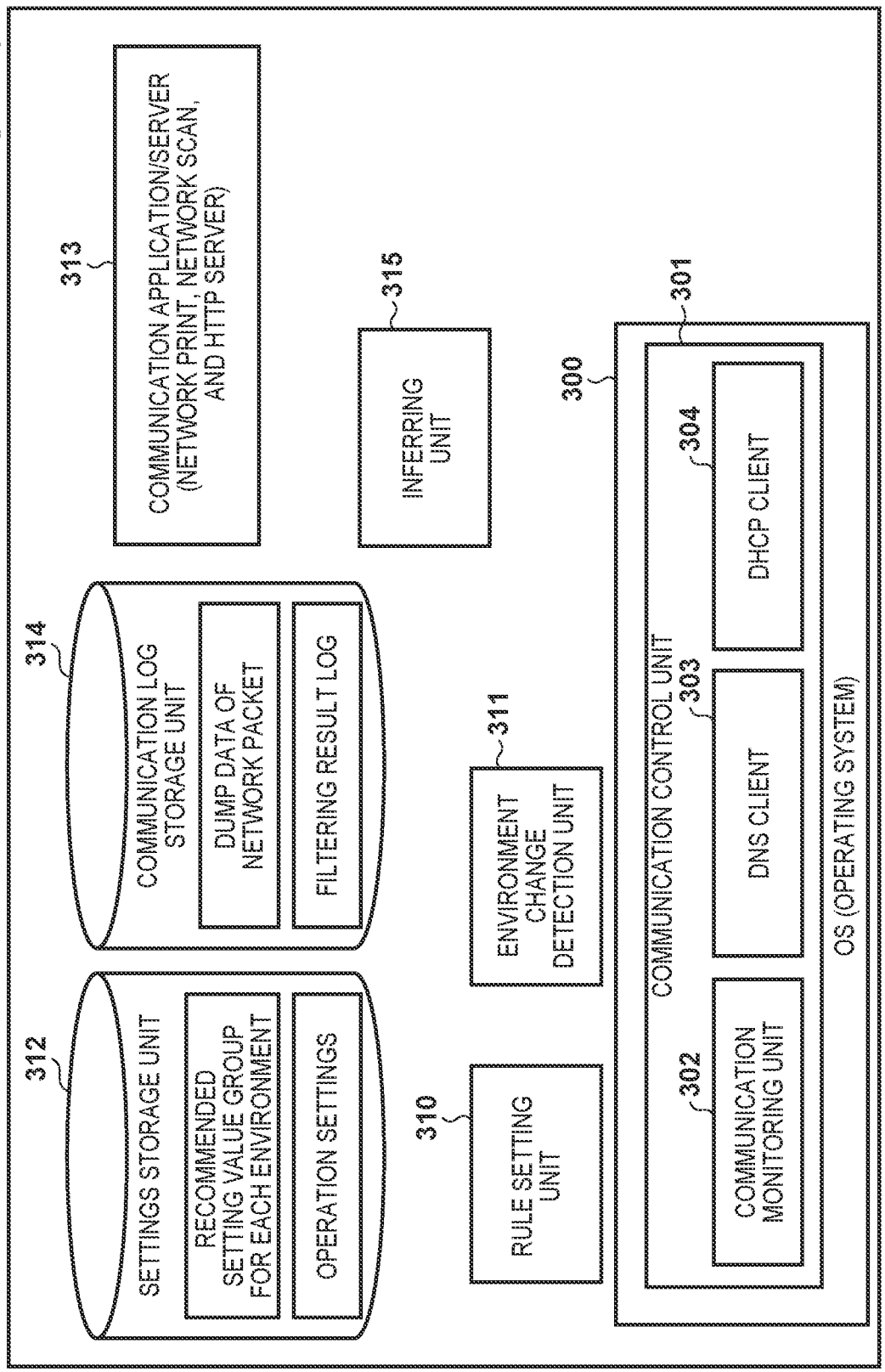

F I G. 6
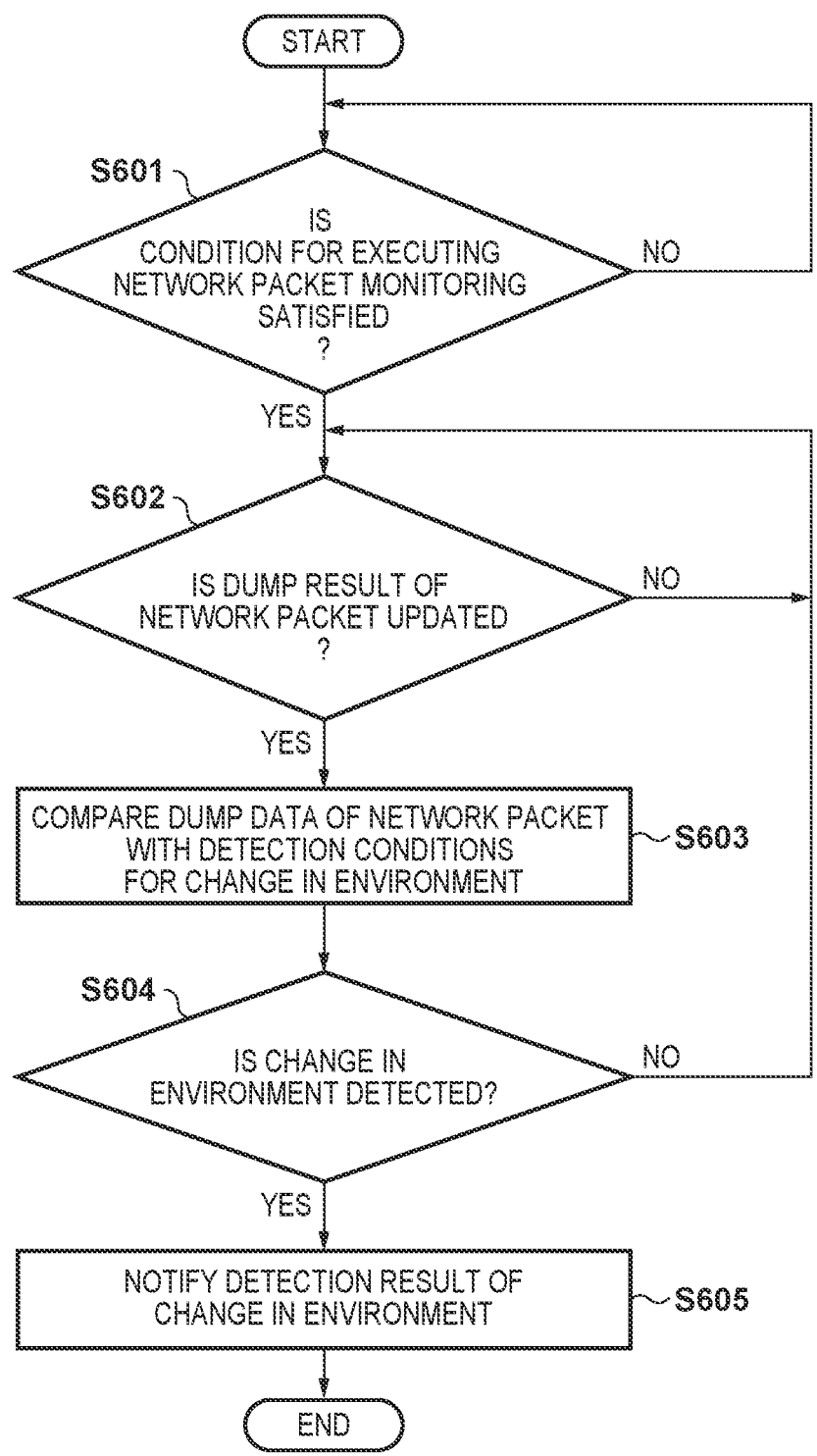

FIG. 9A

SETTING/REGISTRATION
  <RECOMMENDED SECURITY SETTINGS>
CHANGE IN USAGE ENVIRONMENT IS DETECTED.
REVIEW SETTING OF USAGE ENVIRONMENT.

ENVIRONMENT TYPE

| COMPANY INTRANET TYPE |
| DIRECT INTERNET CONNECTION TYPE |
| INTERNET PROHIBITED TYPE |

901

RECOMMEND ENVIRONMENT TYPE IS
"DIRECT INTERNET CONNECTION TYPE".

[ CANCEL ]   [ APPLY ]

IT IS DETECTED THAT USAGE ENVIRONMENT IS
CHANGED TO DIRECT INTERNET CONNECTION TYPE.

APPLY USAGE
ENVIRONMENT OR REVIEW SETTINGS OF
USAGE ENVIRONMENT
FROM RECOMMENDED SECURITY SETTING.

911

| APPLY USAGE ENVIRONMENT CHANGE | OPEN RECOMMENDED SECURITY SETTING | CLOSE |

IMAGE PROCESSING APPARATUS, CONTROL METHOD THEREFOR, AND MEDIUM

BACKGROUND OF THE INVENTION

Field of the Invention

The present invention relates to an image processing apparatus that connects to a network, a control method therefor, and a medium.

Description of the Related Art

Typically, an information processing apparatus that connects to a network includes a setting function for setting security-related function settings on the basis of a user operation. The security settings required for information processing apparatuses have become complex in recent years due to information processing apparatuses being installed in various types of environments, including teleworking spaces and common spaces shared by an unspecified number of people. The technique described in Japanese Patent Laid-Open No. 2007-185814 sets the security-related function settings of an MFP collectively in accordance with a security level set by a user from a plurality of security levels.

However, even with the security levels being displayed, selecting the appropriate security level may be difficult for the user, and even after selecting a security level, the selection may not suit the actual environment. In this case, the default settings may be used without the settings being set, security not suiting the environment may be used, or the information processing apparatus may be used in a state in which the security is not guaranteed.

SUMMARY OF THE INVENTION

The present invention provides a system for detecting that a network environment has changed and notifying a user of the detected change.

According to one aspect of the present invention, an image processing apparatus comprising: at least one processor; and at least one memory including at least one program, wherein the at least one program causes the at least one processor to perform: setting a first security setting for the image processing apparatus as a security setting of the image processing apparatus, monitoring packets transmitted and received by the image processing apparatus, and providing a notification relating to a need to change the security setting when a packet with a result from monitoring via the monitoring matching a predetermined condition is found; and wherein the predetermined condition is associated with the first security setting is provided.

According to the present invention, a system for detecting that a network environment has changed and notifying a user of the detected change can be provided.

Further features of the present invention will become apparent from the following description of exemplary embodiments with reference to the attached drawings.

BRIEF DESCRIPTION OF THE DRAWINGS

FIG. 3 is a diagram illustrating an example of the software configuration of the MFP 101.

FIG. 6 is a flowchart illustrating an example of control in the MFP 101.

FIGS. 9A and 9B are diagrams illustrating examples of screens displayed on the operation unit 216 of the MFP 101.

DESCRIPTION OF THE EMBODIMENTS

Figure 1:
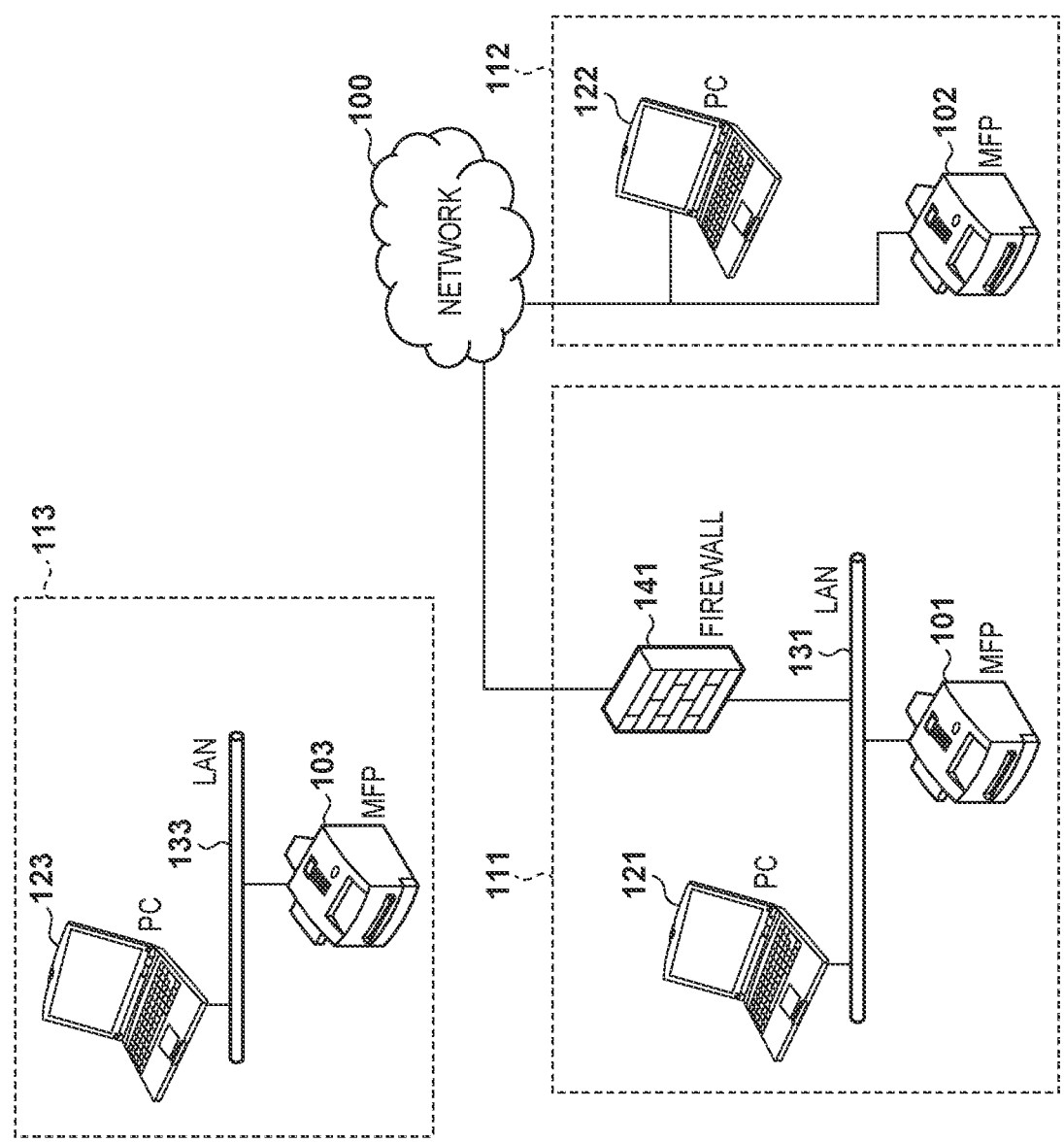
FIG. 1 is a diagram illustrating an example of an information processing system.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

FIG. 1 is a diagram illustrating an example of an information processing system according to the present embodiment. Multi Function Peripherals (MFPs) 101 to 103, which are examples of information processing apparatuses according to the present embodiment, are installed in different installation environments 111 to 113. The MFPs are image processing apparatus with at least a scanning function. Herein, an installation environment refers to an environment where an information processing apparatus is used by a user. The types (categories) of networks prepared for each usage environment that the information processing apparatuses connect to are different. The installation environments 111 to 113 illustrated in the FIG. 1 includes, as a network type, a company intranet environment 111, a direct internet connection environment 112, and an internet prohibited environment 113.

The company intranet environment 111 is an intranet environment to which the MFP 101 and a PC 121 are connected via an in-company Local Area Network (LAN) 131. A firewall 141 is installed at the interface between the LAN 131 and an Internet 100. In other words, communication between the information processing apparatuses in the company intranet environment 111 and the Internet 100 is monitored and protected by the firewall 141. Thus, in the company intranet environment 111, threats such as attackers accessing the information processing apparatuses from the Internet 100 are greatly reduced.

However, a firewall is not installed in the direct internet connection environment 112. The direct internet connection environment 112 is an environment in which the MFP 102 and a PC 122 are directly connected to and communicate with the Internet 100. Thus, information processing apparatuses, such as the MFP 102 and the PC 122, require measures against threats such as access by attackers from the Internet 100 by using a personal firewall function in the information processing apparatuses.

The internet prohibited environment 113 is a closed network environment isolated from other networks such as the Internet 100. Information processing apparatuses, such as the MFP 103 and a PC 123, are connected to one another via a LAN 133. In the internet prohibited environment 113, network communication can only be performed between the information processing apparatuses installed on the LAN 133. Each information processing apparatus cannot be accessed by an unspecified user on the Internet 100.

In the present embodiment, the environments in which the information processing apparatuses such as the MFPs are used are divided into three categories, the installation environments 111 to 113 described using FIG. 1, and a collective setting function is provided for collectively setting the settings relating to security suitable for each category. The collective setting function is a function that can collectively execute a security policy or settings suitable for the use environment by presenting options indicating categories to the user and accepting the selection of an option from the user, simplifying how the user can set security settings. The set category is stored in a storage 214 or the like included in the MFP 101, for example.

However, when the user uses the collective setting function, even if the user selects a suitable category, the categories of the installation environment may change due to switching network infrastructure, moving office, or the like. In this case, the information processing apparatus may be used in a state set with the security settings for a category not suitable for the usage environment. In other words, problematically, the information processing apparatus may be used in a state in which security is not guaranteed.

In the present embodiment, in light of at least one of the problems described above, a system is provided that uses a result of detecting a change in a category corresponding to an environment in which an information processing apparatus is used on the basis of information relating to a network. Note that the present invention is not limited by the definition of category described above, and category may be defined as a part of that described in the present embodiment or another category.

A detailed description follows. First, categories corresponding to the three installation environments described using FIG. 1 and security measures required for each installation environment will be described using Table 1.

TABLE 1

| Category corresponding to installation environment | | | |
|---|---|---|---|
| | Company intranet type | Internet prohibited type | Direct Internet connection type |
| Communication path encryption | ON | | ON |
| Disable legacy protocols | ON | | ON |
| Enable personal firewall | | | ON |
| Strengthen safety of authentication | ON | | ON |
| Disable file sharing function | | | ON |
| Disable external storage device | ON | ON | ON |

The MFPs 101 to 103, which are examples of information processing apparatuses, include various types of settings items including settings items relating to security function and other settings items and execute each type of control of the MFP 101 according to the setting value corresponding to the settings item. In the present embodiment, the target items for collective settings relating to security function are the six items list in the left end column of Table 1.

Communication path encryption is a security measures for preventing information leakage via the encryption of contents communicated on the network. An example of a function for implementing communication path encryption is Transport Layer Security (TLS). In an environment connected to the Internet, there is a possibility of the communication contents being intercepted by a third party. Thus, communication contents are preferably encrypted. In other words, except for in the internet prohibited environment 113, communication path encryption is recommended.

Disabling legacy protocols is a security measure for preventing spoofing and information leakage by disabling functions using unsafe legacy communication protocols. An example of a legacy protocol is Windows Internet Name Service (WINS). In a similar manner to the communication path encryption, in an environment connected to an external network such as the Internet, the legacy protocols are preferably set to disabled. In other words, except for in the internet prohibited environment 113, disabling legacy protocols is recommended.

A personal firewall is a firewall installed and used in an MFP. In a similar manner to a typical firewall, the personal firewall monitors communication between the MFP and an external network such as the Internet. Examples of functions of the firewall include Internet Protocol (IP) filtering and port number filtering. IP filtering is a security measure including reading the destination information and source information of communication packets and allowing only communication packets with a preset destination information and source information. In this manner, access by third parties and information leakage can be prevented. Port number filtering is a security measure for closing unused ports to prevent infiltration from a port. This can prevent a Denial of Service (Dos) attack, which is a cyber-attack which causes vulnerability via an overload. In an environment connected to an external network that does not have a firewall installed, information leakage and DoS attacks are possible. Thus, a personal firewall is preferably enabled. In other words, except for in the internet prohibited environment 113 which is not connected to an external network and the company intranet environment 111 which has a firewall set up, enabling a personal firewall is recommended.

Strengthening the safety of authentication by prohibiting the caching of passwords and specifying a minimum number of characters for passwords strengthens measures against spoofing. Except for in the internet prohibited environment 113 where apparatuses are connected within an isolated network, there is a possibility of spoofing. Thus, the safety of authentication is preferably strengthened.

A file sharing function is a function for sharing files on a network within an environment. In an environment where the network within the environment is shared by unspecified users, to prevent information leakage, the file sharing function is preferably disabled. In other words, except for in a private network environment where the network in the environment is shared by specified users, disabling the file sharing function is recommended. As described above, a private network environment according to the present embodiment includes the company intranet environment 111 and the internet prohibited environment 113. Thus, in the direct internet connection environment 112 with a public network, disabling the file sharing function is recommended. Note that an example of a setting relating to the file sharing function is a Server Message Block (SMB) server setting.

Disabling an external storage device is a setting for making an external storage device such as a Universal Serial Base (USB) storage device unable to be used in the MFP. In this manner, information stored in the MFP being read out to the external storage device can be prevented, and information leakage can be prevented. Also, being infected by a computer virus via a USB storage device and the accompanying information leakage can be prevented. The threat of information leakage via a USB or similar external storage device is shared across all installation environments. Thus, external storage devices are preferably disabled in all installation environments.

The recommended setting values described above are listed in Table 1. Items for which settings are recommend are labelled with ON, and items for which settings may be ON or OFF are marked with a diagonal line.

MFP 101 Hardware Configuration

Figure 2:
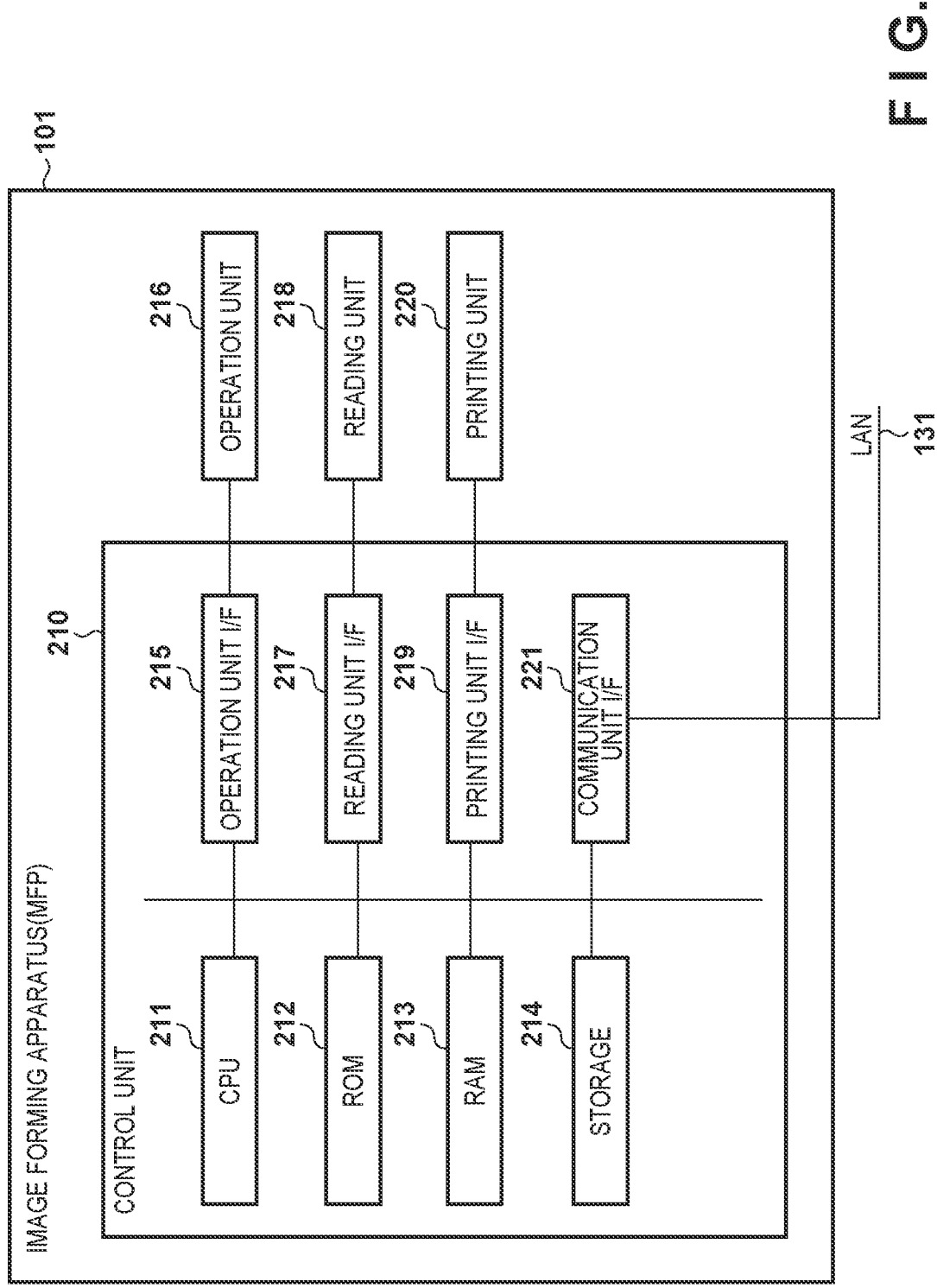
FIG. 2 is a diagram illustrating an example of the hardware configuration of an MFP 101.

The hardware configuration of the MFP 101, which is an example of an information processing apparatus according to the present embodiment, will be described using FIG. 2. Note that the hardware configuration of the MFP 101 is illustrated in FIG. 2, but the hardware configuration of the MFPs 102 and 103 is similar to the hardware configuration of the MFP 101.

The MFP 101 includes a reading function for reading an image on a sheet, a file transmitting function enabling a read image to be transmitted to an external communication apparatus, and the like. A printing function for printing an image on a sheet is also provided.

Note that as described above, the MFP 101 is an example of an information processing apparatus in the present embodiment. However, no such limitation is intended. For example, a Single Function Peripheral (SFP) with a single function, such as a scanner or a printer, may be used. Also, the present embodiment can be applied to various types of communication devices that connect to a network including a 3D printer, a smartphone, a digital camera, a network camera, a television or an IoT device.

A control unit 210 including a central processing unit (CPU) 211 controls the overall operations of the MFP 101. The CPU 211 reads out a control program stored in a Read Only Memory (ROM) 212 or the storage 214 and executes various types of control including print control and read control. The ROM 212 stores a control program executable by the CPU 211. A Random Access Memory (RAM) 213 is a main storage memory of the CPU 211 and is used as a working area or temporary storage region to load various control programs. The storage 214 stores print data, image data, various programs, and various settings information. In the present embodiment, the storage 214 is expected to be an auxiliary storage apparatus such as a Solid State Drive (SSD). However, a non-volatile memory such as a Hard Disk Drive (HDD) may be used instead of the SSD. In this manner, the hardware including the CPU 211, the ROM 212, the RAM 213, storage 214, and the like constitute a so-called computer.

Note that in the MFP 101 of the present embodiment, one CPU 211 uses one memory (the RAM 213) to execute the processing illustrated in the flowchart described below. However, other configurations may be used. For example, a plurality of CPUs, RAMs, ROMs, and storages may be configured to cooperate to execute the processing illustrated in the flowchart described below. Also, a portion of the processing may be executed using a hardware circuit.

An operation unit interface (I/F) 215 connects an operation unit 216 and the control unit 210. The operation unit 216 is provided with a liquid crystal display unit with a touch panel function, various types of physical keys, or the like. The operation unit 216 functions as a display unit that displays information and a reception unit that receives user instructions.

A reading unit I/F 217 connects a reading unit 218 and the control unit 210. The reading unit 218 reads a document placed on a platen or ADF and generates a read image. Note that the generated read image is stored in the storage 214 or the RAM 213. The read image generated by the reading unit 218 is transmitted to an external apparatus via a network and used in printing an image on a sheet.

A printing unit I/F 219 connects a printing unit 220 and the control unit 210. The read image generated by the reading unit 218 and stored in the storage 214 or the RAM 213 is transferred from the control unit 210 to the printing unit 220 via the printing unit I/F 219. The printing unit 220 receives the read image via the control unit 210 and prints the read image on a sheet. The printing unit 220 can also perform printing based on a print job received from an external apparatus. Note that the printing method of the printing unit 220 may be an electrophotographic method or an inkjet method. Another printing method such as a thermal transfer method may also be used.

A communication unit I/F 221 is a communication interface included in the MFP 101. The control unit 210 connects to the LAN 131 via the communication unit I/F 221. The communication unit I/F 221 can transmit data to a server on the Internet via a device, a server, or a not-illustrated gateway on the LAN 131.

In the present embodiment, the communication unit I/F 221 is expected to be a communication interface that performs wired communication compliant with Ethernet (registered trademark). However, no such limitation is intended. For example, a wireless communication interface compliant with the IEEE 802.11 series may be used. Note that the communication unit I/F 221 of the MFP 101 is connected to the LAN 131, but the network connected to is different depending on the installation environment. For example, the MFP 102 is directly connected to the Internet 100. A mobile phone line interface or the like may be used as the communication I/F for directly connecting to the Internet 100, for example. The MFP 103 is connected to the LAN 133.

MFP 101 Software Configuration

FIG. 3 is a diagram illustrating an example of the software configuration of the MFP 101. The software in the MFP 101 is formed from three layers, an Operating System (OS) 300, a router setting unit 310 to an inferring unit 315 functioning as middleware, and a communication application/server 313.

The OS 300 is a fundamental piece of software that controls all of the operations of the MFP 101. The OS 300 includes a communication control unit 301. The communication control unit 301 controls the exchange of packets via the communication unit I/F 221. The communication control unit 301 includes a communication monitoring unit 302.

In the present embodiment, the communication monitoring unit 302 is expected to be a software tool, such as tcpdump or iptables, that can run on the OS 300, which is a Linux (registered trademark) system or the like. The communication monitoring unit 302 monitors the packets the MFP 101 transmits and receives via the communication unit I/F 221 and outputs and records the monitoring results as a log.

Next, an example of the communication application/server 313 communicating with an external apparatus will be described. In this case, the communication application/server 313 sends a request to the communication control unit 301 of the OS 300 for data transmission. When the communication control unit 301 receives the request for data transmission, the communication control unit 301 cooperates with the communication unit I/F 221 and transmits data to an external apparatus. Also, the communication control unit 301 controls the exchange of packets via the communication unit I/F 221. The communication control unit 301 includes a Domain Name System (DNS) client 303 and a Dynamic Host Configuration Protocol (DHCP) client 304.

In the present embodiment, the DNS client 303 is expected to be a DNS client provided standard with the OS 300, a Linux (registered trademark) system or the like. When name resolution of the domain name is performed using these clients, [nameserver "IP address of DNS server"] is written in the file located at [/etc/resolve.conf] to specify the DNS server. For redundancy, a plurality of DNS servers to use can be specified. The DNS client 303 includes a function for sending a request to the specified DNS server for name resolution of the host name and the domain name. When the DNS client 303 receives a name resolution result as a response to the request, the DNS client 303 obtains the IP address corresponding to the host name and the domain name.

The DHCP client 304 automatically obtains network information including the IP address, default gateway, subnet, and the like from the DHCP server on the network. Also, the DHCP client 304 can also use a Web Proxy Auto-Discovery (WPAD) technique to attempt to obtain proxy server information from the DHCP server.

Also, the DNS client 303 can also transmit a query relating to WPAD. When the DNS server receives a query relating to WPAD, the DNS server responds to the DNS client 303 with proxy server information. In the present embodiment, when network information is obtained using the DHCP client 304 and proxy server information cannot be obtained, a query relating to WPAD by the DNS client 303 can also be performed.

Communication with Outside

Next, an example of the communication application/server 313 communicating with an external apparatus will be described. In this case, the communication application/server 313 sends a request to the communication control unit 301 of the OS 300 for data transmission. When the communication control unit 301 receives the request for data transmission, the communication control unit 301 transmits data to an external apparatus. Here, when the destination of the external apparatus is specified by the host name, the communication control unit 301 cooperates with the DNS client 303, executes the name resolution described above, and obtains the IP address of the external apparatus. Then, the communication control unit 301 cooperates with the communication unit I/F 221 and transmits a packet with the IP address as the destination.

Also, the communication control unit 301 also controls transferring the packet received by the communication unit I/F 221 to an internal communication application or server.

The communication application/server 313 is an application layer module for exchanging data between the MFP 101 and the external apparatus. For example, the MFP 101 includes modules including a network print application, a network scan application, a HTTP server, and the like.

The network print application is an application for receiving print data. The network print application cooperates with the printing unit 220 and prints an image on a sheet on the basis of a print job received from a print client of the external apparatus. The network scan application is an application for transmitting a file based on a read image obtained by the reading unit 218 reading a document to a scan client of the external apparatus. The HTTP server is a Web server for providing the settings screen and the information confirm screen of the MFP 101 to a Web browser. Note that though omitted due to space limitations, the MFP 101 also includes various other communication applications and servers.

MFP Middleware

Next, the middleware of the MFP 101 will be described. A settings storage unit 312 stores settings set via the middleware and setting values and data used by the middleware and the OS. In the present embodiment, the storage unit 312 stores recommended settings data groups illustrated in Table 1, which are combinations of the categories corresponding to the installation environments and the recommended security measures settings items and setting values for each category. In other words, the categories and the corresponding recommended settings data groups are associated together and stored. Also, the storage unit 312 stores security settings set by the user such as the administrator for the MFP 101. The network type (category) also set may also be stored.

Also, the settings storage unit 312 combines the various types of settings items and the current setting values corresponding to the settings items as the operation settings of the MFP 101 and stores the operation settings. In the present embodiment, for example, a Boolean value of True/False is stored for each settings item. In other words, True is stored for the setting values in Table 1 indicated as ON, and False is stored for the setting values in Table 1 marked with a diagonal line. False indicates that there is no particular recommended setting value. Note that this storage method for data is an example, and no such limitation is intended.

A communication log storage unit 314 is transmitting and receiving information of a network packet obtained by the communication monitoring unit 302. The communication log storage unit 314 stores the dump data of the network packet obtained via tcpdump as a log. Also, the communication log storage unit 314 stores the log of the packet filtering result obtained via iptables. Note that these logs stored in the communication log storage unit 314 are examples, and no such limitation is intended.

A rule setting unit 310 provides the collective setting function described above. The collective setting function presents options indicating categories to the user, simplifying how the user can set security settings. Also, the collective setting function is a function that can collectively execute a security policy or settings suitable for the use environment by accepting the selection of an option from the user.

An environment change detection unit 311 detects a change in a category corresponding to the use environment set in the MFP 101 uses the various logs stored in the communication log storage unit 314. When the environment change detection unit 311 detects a change in the category, the environment change detection unit 311 notifies the rule setting unit 310 that a change in the category has been detected.

The inferring unit 315 infers the environment the MFP 101 is used in on the basis of information relating to the network obtained via the network and information relating to the network obtained by obtaining the operation settings from the settings storage unit 312. The environment change detection unit 311 sends a request to the inferring unit 315 to infer the network environment. The inferring unit 315 infers the environment the MFP 101 is used in and responds with the inference result.

Change in Environment Notification

Figure 4A:
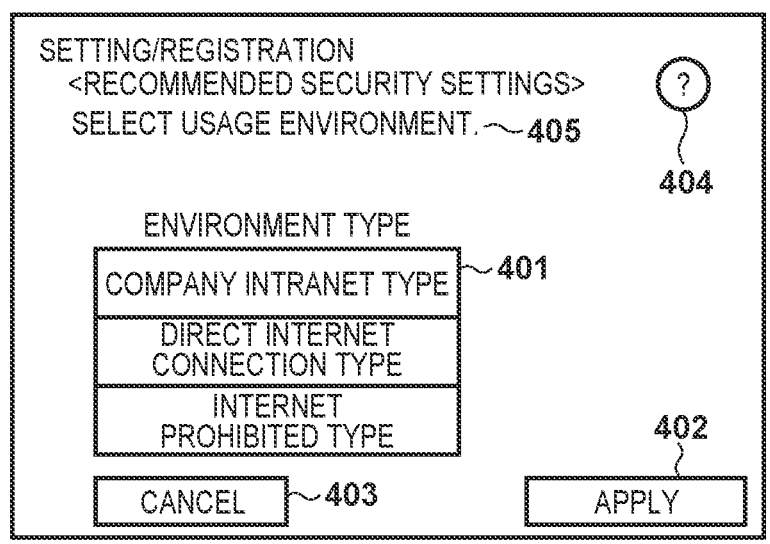
FIGS. 4A, 4B, and 4C are diagrams illustrating examples of screens displayed on an operation unit 216 of the MFP 101.
Figure 4B:
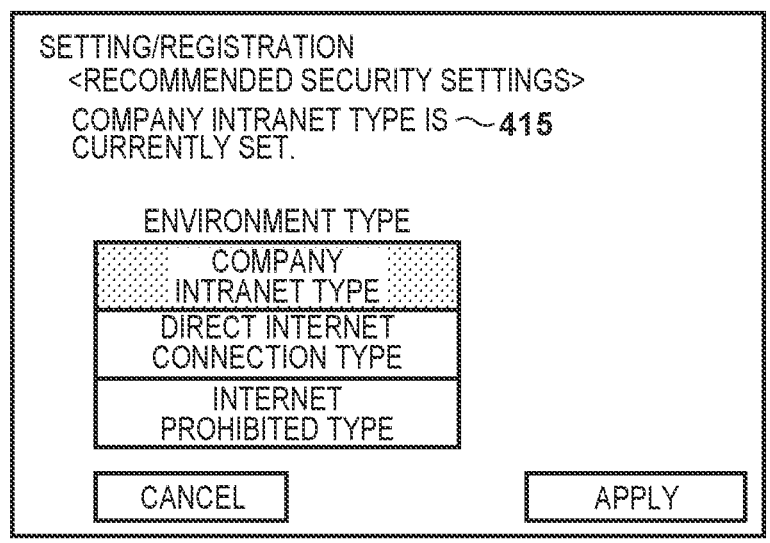
Figure 4C:
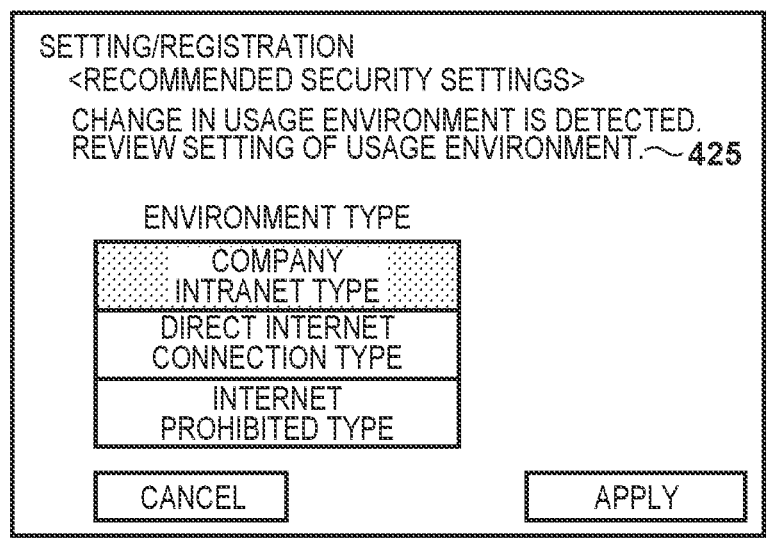

Also, the collective setting function of the present embodiment includes a notification function for notifying the user of the detection result of a change in the use environment. The notification function for the detection result of a change in the use environment will now be described. FIGS. 4A, 4B, and 4C are diagrams illustrating examples of settings screens displayed on the operation unit 216 of the MFP 101 by the rule setting unit 310. FIG. 4A illustrates an example of a settings screen displayed when the use environment is not set. FIG. 4B illustrates an example of a settings screen displayed when the use environment is set. FIG. 4C illustrates an example of a settings screen including the inference result notification.

As illustrated in FIG. 4A, a list 401 is a list including a plurality of options corresponding to categories. The user can select one option displayed in the list 401. In this example of the present embodiment, the environments the MFP is used in corresponding to the categories are displayed as options as an abbreviated character string.

A key 402 (alternatively, an instruction unit or button 402) is a key used to apply the recommended setting value corresponding to the selected category to the operation settings of the MFP 101. A cancel key 403 is a key used to discard a setting set via the settings screen of FIG. 4A without applying the setting to the operation settings of the MFP 101.

Information 405 is a message notifying the user that the environment type is not set and to select an environment type. An icon 404 is a key used to display a manual that describes the environment types in detail. When the user selecting the icon 404 is detected, the setting unit 310 displays the manual relating to the recommended security settings.

When the use environment is set, the rule setting unit 310 displays the settings screen illustrated in FIG. 4B on the basis of the selected use environment. Information 415 is an example of information displayed instead of the information 405 and is a message notifying the user of the currently set use environment. FIG. 4B illustrates an example of a screen displayed when company intranet type is set as the category corresponding to the environment the MFP is used in.

Also, when a notification of a change in the category corresponding to the use environment is received from the environment change detection unit 311, the rule setting unit 310 displays the settings screen illustrated in FIG. 4C on the basis of the notification result. Information 425 is an example of information displayed instead of the information 415 and includes information indicating that a change in the category has been detected and information indicating that a category change is required. The notification examples illustrated in FIGS. 4A, 4B, and 4C can be considered messages prompting the user to change the settings to security settings suitable (or appropriate) for the currently specified network type following a change in the network environment.

Figure 5A:
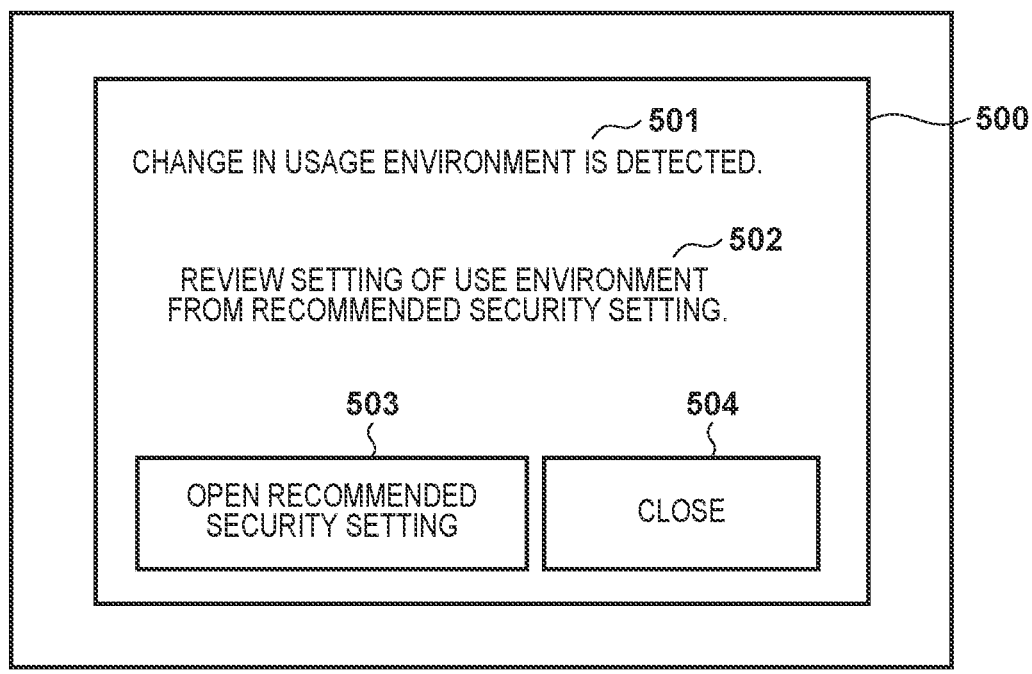
FIGS. 5A and 5B are diagrams illustrating examples of screens displayed on the operation unit 216 of the MFP 101.
Figure 5B:
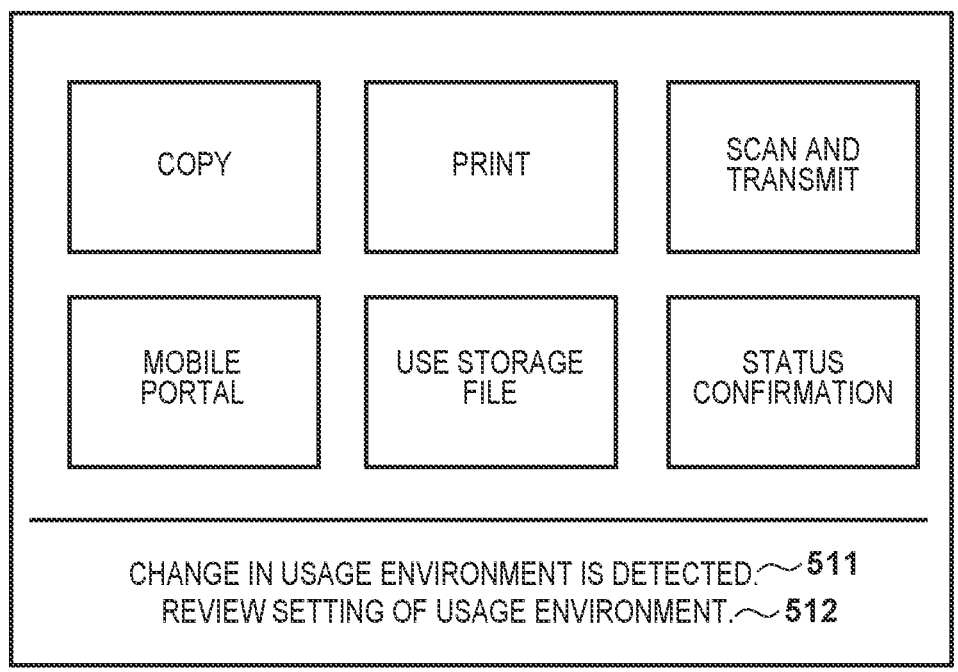

Also, the rule setting unit 310 may notify the user of a change in the category corresponding to the use environment using a method other than the settings screen illustrated in FIG. 4C. FIGS. 5A and 5B are diagrams illustrating examples of screens of the rule setting unit 310 notifying the user of a change in the category. FIG. 5A illustrates an example of a notification displayed directly after detection of a change in the category. FIG. 5B illustrates an example of a notification continuously displayed after detection of a change in the category. The notification illustrated in FIGS. 5A and 5B are notifications notifying the user of a change in the network environment but can be considered notification for informing (or warning) the user that the security settings need to be changed.

When a change in the category is detected, the rule setting unit 310 displays a notification screen 500 on the operation unit 216 of the MFP 101. The notification screen 500 is a pop-up notification displayed on the operation unit 216. Information 501 is information notifying the user that a change in the category has been detected. Information 502 is information prompting the user to change the category following a change in the category. A shortcut key 503 is a key for transitioning to the settings screen illustrated in FIG. 4. When the shortcut key 503 is pressed (or touched), the settings screen illustrated in FIGS. 4A, 4B, or 4C is directly transitioned to. A cancel key 504 is a key used to close the notification screen 500. When the cancel key 504 is pressed, the notification screen 500 is closed and the screen displayed previous to the notification screen 500 is transitioned to.

Also, FIG. 5B illustrates an example of notifying the user by displaying information relating to the collective setting function in a status display region on the operation unit 216. Information 511 is information, similar to the information 501, notifying the user that a change in the category has been detected. Information 512 is information, similar to the information 502, prompting the user to change the category following a change in the category. In the present embodiment, by notifying using the status display region, the notification can be continuously displayed even after the pop-up notification is closed.

Change in Use Environment Detection Processing

Figure 7:
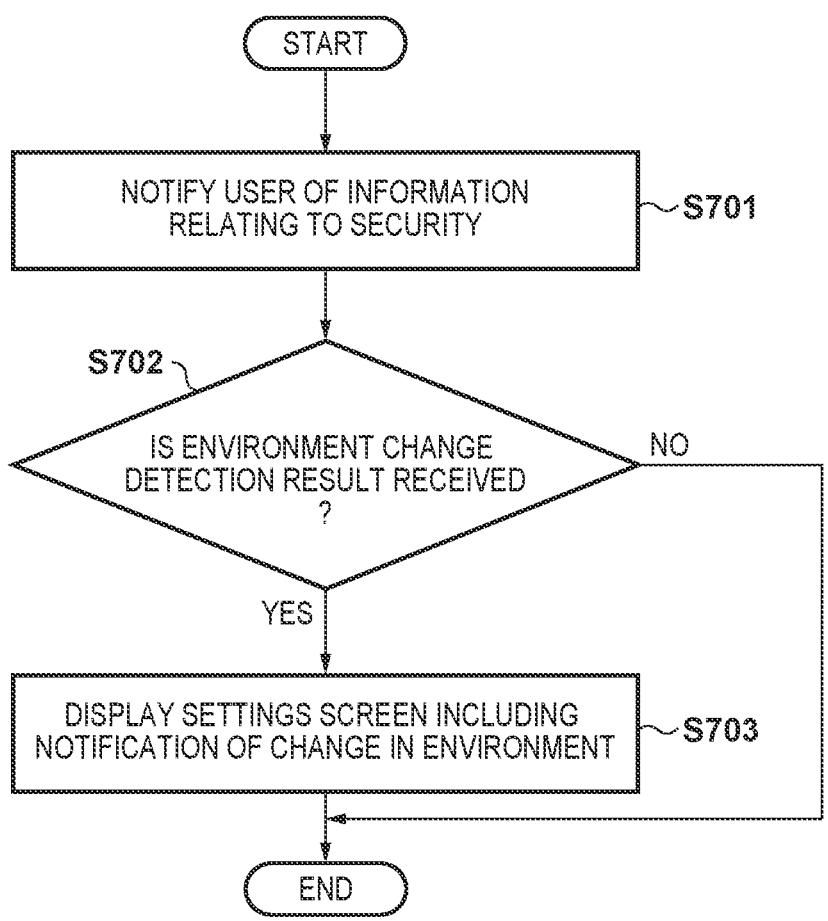
FIG. 7 is a flowchart illustrating an example of control in the MFP 101.

Next, a method for detecting a change in the use environment will be described in detail using FIGS. 6 and 7 and Table 1. FIG. 6 is a flowchart illustrating an example of the processing for detecting a change in the use environment according to the present embodiment. Each process illustrated in the flowchart of FIG. 6 is implemented by a program for implementing a control module stored in the ROM 212 or the storage 214 being loaded on the RAM 213 and executed by the CPU 211. Note that the data transmitting and receiving processing and the like is implemented in cooperation with the communication unit I/Fs. Also, to make clear the subject of the processing, the software modules executed by the CPU 211 may be used as the subject in the following descriptions. The flowchart illustrated in FIG. 6 is an example of processing executed after the power supply of the MFP 101 is switched from OFF to ON and start-up processing has ended. Note that in FIG. 6, due to space limitations, only processing relating to inferring and collective setting are listed.

In step S601, the rule setting unit 310 determines whether or not the condition for executing network packet monitoring is satisfied. When it is determined that the condition is satisfied, the process branches to step S602. Specifically, when start-up of the communication monitoring unit 302 has ended and operation has started and storage of dump data of the network to the communication log storage unit 314 has started, it is determined that the condition for executing monitoring is satisfied. When the rule setting unit 310 determines that the condition for executing monitoring is satisfied, a request for network environment monitoring is sent to the environment change detection unit 311.

In step S602, when the request is received, the environment change detection unit 311 starts monitoring for whether dump data of the network packets of the communication log storage unit 314 has been updated. When a dump data update is detected, the environment change detection unit 311, in steps S603 and S604, executes processing to detect whether there is a change in the environment. Note that in the present embodiment, the detection processing is expected to be executed at 10-minute intervals. However, in other embodiments, the processing may be executed each time one packet is received, or every 24 hours, but the execution timing and interval are not limited thereto.

In step S603, when a dump data update is detected, the environment change detection unit 311 compares the updated dump data with the detection conditions for the change in the environment corresponding to each category. The environment change detection conditions for each category will be described using Table 2. Note that the detection conditions listed in Table 2 are examples for implementing the present embodiment, and the conditions are not limited to the listed conditions.

TABLE 2

| Category MFP is set to | Detection condition |
|---|---|
| Internet prohibited type | Network packet with a global IP address as source detected |
| | Network packet with a global IP address as destination detected |
| Direct Internet connection type | LLMNR search request packet detected |
| | NetBIOS search request packet detected |
| Company intranet type | NetBIOS search request packet detected |

In the present embodiment, determination of the environment change detection conditions defined for each category is performed and changes in the environment the MFP is used in are detected. Also, in the present embodiment, detection conditions shared across all categories are collectively listed due to space limitations. In other words, in step S603, the environment change detection unit 311 compares the dump data with the detection condition for each category listed in Table 2. Note that for the IP address, it is determined from the transmission source and destination IP address stored in the IP header of the network packet. For the protocol, it is determined from the port number stored in the User Datagram Protocol (UDP) header. For the communication request, it is determined from the result of a Transport Control Protocol (TCP) connection request.

Transmitting and receiving a packet with a global IP address as the destination or transmission source do not happen when the category is the internet prohibited type. Thus, as indicated in Table 2, if there is such a packet, irrespective of the type being the internet prohibited type, there is a possibility that the category has changed. Thus, for the internet prohibited type, such a packet is an environment change determination condition. Also, legacy protocols such as NetBIOS is not normally used in environments connected to the Internet. Thus, if a NetBIOS search packet is detected, irrespective of the type being the company intranet type or the direct internet connection type, there is a possibility that the category has changed. Thus, for the company intranet type and the direct internet connection type, such a packet is an environment change determination condition. Also, a Link-local Multicast Name Resolution (LLMNR) search packet is a packet used in an IPv6 local segment. Thus, if a NetBIOS LLMNR search packet is detected, irrespective of the type being the direct internet connection type, there is a possibility that the category has changed. Thus, for the company intranet type, such a packet is an environment change determination condition.

In step S604, the environment change detection unit 311 executes determination of whether a detection condition is met via a comparison result. In other words, depending on the category listed in Table 2, it is determined whether the corresponding packet is found. When the detection condition is met, it is determined that a change in the environment has been detected, and the process branches to step S605.

In step S605, when the environment change detection unit 311 determines that the detection condition is met, the environment change detection unit 311 notifies the rule setting unit 310 that a change in the environment has been detected.

Via the processing described above, the environment change detection unit 311 can detect a change in the category corresponding to the environment the MFP 101 is used in from the dump data of the network packet obtained via the communication monitoring unit 302. In other words, a packet not used according to the specified environment settings can be detected, and by this, whether the current security settings are suitable for the network environment can be determined, allowing the possibility that the environment settings have changed to be detected. When unsuitable settings are found, it can be inferred that the network environment has changed.

Next, using the detection result of the environment change detection unit 311 will be described using FIG. 7. The processing illustrated in the flowchart of FIG. 7 is executed when a detection result is received by the rule setting unit 310 from the environment change detection unit 311. Note that in FIG. 7, due to space limitations, only processing relating to the collective setting function is listed.

In step S701, the rule setting unit 310 displays the notification screen illustrated in FIGS. 5A and 5B on the operation unit 216.

In step S702, the rule setting unit 310 determines whether an environment change detection result has been received.

In step S703, when an environment change detection result has been received, the rule setting unit 310 displays a settings screen, corresponding to FIG. 4C, including a notification of the change in the environment on the operation unit 216.

Note that in step S703, the screen of FIG. 5A may be displayed. Also, in step S703, information indicating that an environment change detection result has been received may be stored in the storage 214 or the like, this may be referenced by the MFP when displaying a standby screen for selecting a function such as copying, and the screen of FIG. 5B may be displayed if there is a change in the environment. In this case, addition messages of the messages 511 and 512 may simply be displayed on the normal standby screen.

Via the processing described above, on the basis of the dump data of the network packet, a change in the category corresponding to the environment the information processing apparatus is used in can be detected, and the detection result can be used by the MFP 101. Specifically, by notifying the user of the detection result, the user can be helped to change the category. When the user selects the network environment type, i.e., category, on the user interface screen of FIGS. 4A, 4B, and 4C, the current security settings are changed to security settings in accordance with the selected category.

Second Embodiment

In the first embodiment, a method of detecting a change in the category corresponding to the environment on the basis of the dump data of the network packet is described. In the second embodiment, instead of the dump data of the network packet, a filtering result log may be used. For example, with iptables, by obtaining all of the logs for TCP, UDP, and ICMP, determination of the detection conditions listed in Table 2 can be performed. Specifically, to determine whether an LLMNR packet has been received, whether a received packet from a log with a destination port number of 5355 using UDP exists in the log can be determined. Also, as with other detection conditions, whether the packet is from a log is determined using a combined approach using information including the IP address, the protocol, the port number, and the like. Note that instead of the dump data of the network packet, when using the filtering result log also, the detection processing can be executed via a similar process to that of the first embodiment. Thus, the description using the flowchart is omitted due to space limitations.

Via the processing described above, on the basis of the filtering result log, a change in the category corresponding to the environment the information processing apparatus is used in can be detected.

Third Embodiment

In the first and second embodiments described above, a method of only notifying of a change in the use environment of the MFP is described. In the third embodiment, a method is described in which MFP use environment inference processing is executed when triggered by a possibility that the use environment of the MFP has changed being detected and, when the installed category and the inference result are different, it is determined that an environment change has been detected and the user is notified of this.

The detection conditions according to the present embodiment are listed in Table 3. In Table 3, shared detection conditions across all of the categories are added to the detection conditions listed in Table 2. In the present embodiment, when a detection condition shared across all types is detected, use environment inference processing is executed. The detection conditions shared across all types are, in the example of Table 3, detecting a communication request from a network address with no communication experience and detecting the success of a communication request to a network address with no communication experience. Note that the timing of when the MFP executes the use environment inference processing may be not only that in the example described in the present embodiment, and a different timing may be used. Specifically, when the MFP detects a LLMNR search request packet, inference processing or the like may be executed to determine whether the MFP use environment being set to either the internet prohibited type category or the company intranet type category is appropriate.

TABLE 3

| Category MFP is set to | Detection condition |
|---|---|
| Internet prohibited type | Network packet with a global IP address as source detected<br>Network packet with a global IP address as destination detected. |
| Direct Internet connection type | LLMNR search request packet detected<br>NetBIOS search request packet detected |
| Company intranet type | NetBIOS search request packet detected |
| Shared across all types | Communication request from network address with no communication experience detected<br>Communication request to a network address with no communication experience as destination detected |

Figure 8:
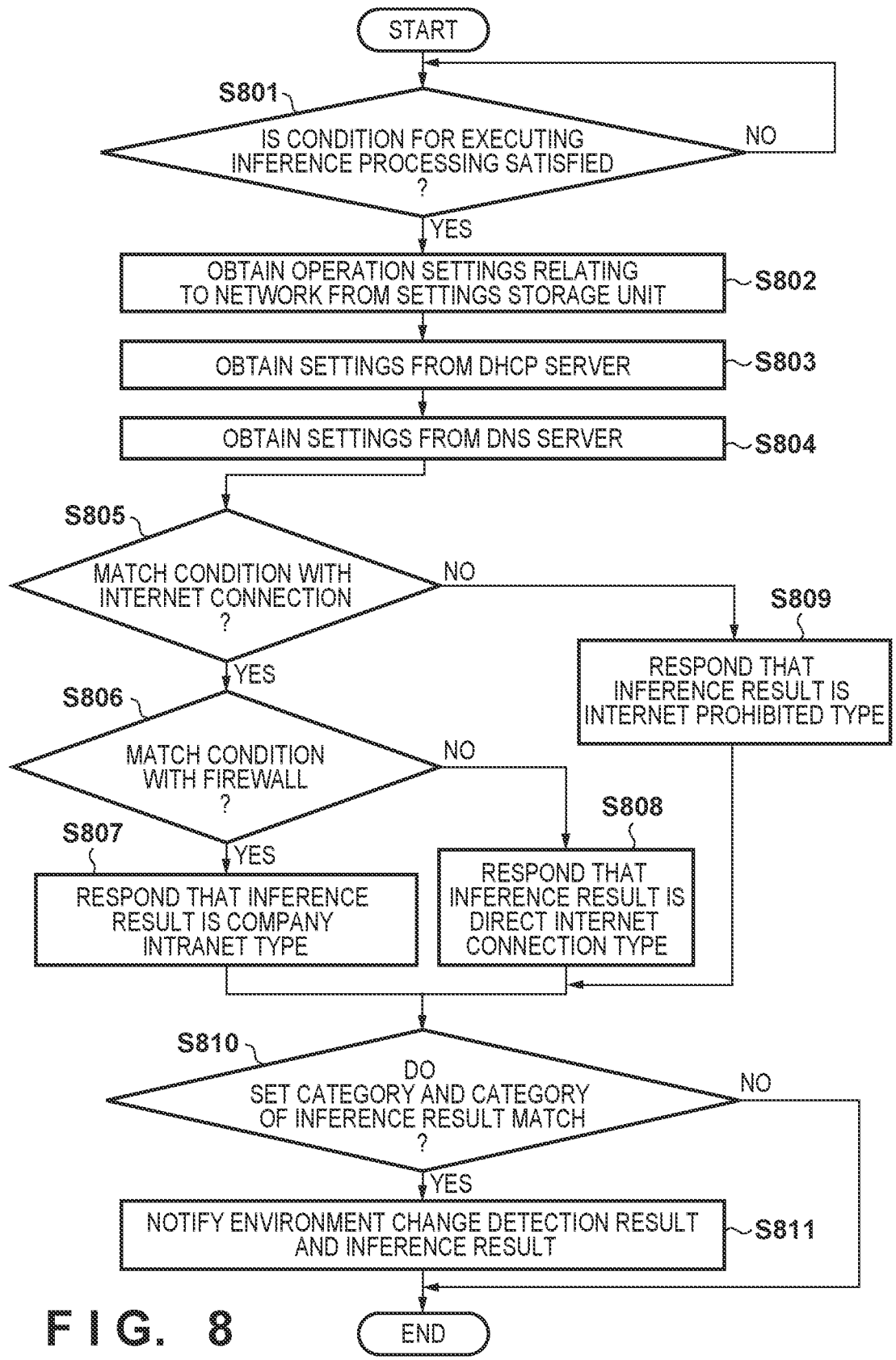
FIG. 8 is a flowchart illustrating an example of control in the MFP 101.

Next, a method for inferring the use environment will be described in detail using FIG. 8 and Tables 4 to 5. FIG. 8 is a flowchart illustrating an example of the use environment inference processing according to the present embodiment. Each process illustrated in the flowchart of FIG. 8 is implemented by a program for implementing a control module stored in the ROM 212 or the storage 214 being loaded on the RAM 213 and executed by the CPU 211. Note that the data transmitting and receiving processing and the like is implemented in cooperation with the communication unit I/Fs. Also, to make clear the subject of the processing, the software modules executed by the CPU 211 may be used as the subject in the following descriptions.

The flowchart illustrated in FIG. 8 is an example of processing executed after the power supply of the MFP 101 is switched from OFF to ON and start-up processing has ended. Note that in FIG. 8, due to space limitations, only processing relating to inferring and collective setting are listed.

In step S801, the environment change detection unit 311 determines whether or not a condition for executing inferring is satisfied. Specifically, when a detection condition shared across all types listed in Table 3 is detected, it is determined that a condition for executing inferring is satisfied. Alternatively, detecting all of the detection conditions listed in Table 3 may be the condition for executing inferring. Also, the settings storage unit 312 stores the operation settings indicating whether or not inference is automatically executed. The operation settings indicating whether or not inference is automatically executed is set via an operation by a user of the like with administrator privileges via a not-illustrated management screen. When automatic inference is set, the setting unit 310 further determines, in a case in which the start-up timing of the MFP 101, a predetermined time (for example, 8 a.m.) or the like is reached, whether a condition for executing inference processing is satisfied. In the present embodiment, for example, a predetermined time being reached is a condition, but no such limitation is intended. Whether a condition for executing inference processing is satisfied can also be determined when a predetermined time interval (for example, 24 hours or 48 hours) from the previous inference has elapsed. When the setting unit 310 determines that the condition for executing inferring is satisfied, a request for network environment inferring is sent to the inferring unit 315.

In step S802, when the request is received, the inferring unit 315 obtains the operation settings relating to the network from the settings storage unit 312. Hereinafter, the operation settings obtained in step S802 are simply referred to as network settings. Next, in step S803, the inferring unit 315 obtains each type of information from the external DHCP server via the DHCP client 304.

Then, in step S804, the inferring unit 315 obtains each type of information from the external DNS server via the DNS client 303. The information relating to the network obtained via the processing of steps S802 to S804 will now be described using Table 4.

TABLE 4

| | | Source of obtaining data | | |
|---|---|---|---|---|
| | Information to obtain | Operation settings | DHCP server | DNS server |
| 1 | Gateway address | YES | YES | NO |
| 2 | DHCP server address | YES | YES | NO |
| 3 | WINS server address | YES | YES | NO |
| 4 | SMTP server address | YES | YES | NO |

TABLE 4-continued

| | | Source of obtaining data | | |
|---|---|---|---|---|
| | Information to obtain | Operation settings | DHCP server | DNS server |
| 5 | POP server address | YES | YES | NO |
| 6 | SIP server address | YES | YES | NO |
| 7 | Settings of service using Internet | YES | NO | NO |
| 8 | Proxy server address | YES | YES | YES |

Information 1 to 6 are settings related to the network obtained by referencing the current operation settings of the MFP 101 or obtained from the DHCP server on the network. In the example of Table 4, the information 1 to 6 are the address of the gateway for accessing the network and the addresses of each type of server. Information 7 is a setting of a cloud service for accessing the MFP 101 or for the MFP 101 to access obtained by referencing the current operation settings of the MFP 101. Specifically, as the information 7, a setting value indicating whether operation settings used by a remote management service that manages MFP 101 device information via a cloud server have been set and a setting value indicating whether operation settings used by a cloud printing service are obtained. Information 8 is a proxy server address and is a network-related setting obtained by referencing the operation settings or obtained using the WPAD technique described above from the DHCP server or the DNS server on the network.

The inferring unit 315 obtains the information relating to the network listed in information 1 to 8 in Table 4. The inferring unit 315 executes the inferring of steps S805 and S806 on the basis of the obtained information. Next, the inference algorithm will be described using Table 5.

TABLE 5

| | Condition | Environment is connected to Internet | Environment has firewall |
|---|---|---|---|
| 1 | Own IP address is global IP address | YES | — |
| 2 | Global IP address is included in various types of server address (3 to 7 of Table 4) | YES | — |
| 3 | Default gateway can be obtained | YES | — |
| 4 | Settings set to allow service using Internet to be used | YES | — |
| 5 | Proxy server address can be obtained | — | YES |

In the present embodiment, determinations of two different characteristics are performed, and the category corresponding to the environment the MFP 101 is used in is inferred. The first determination is a determination of whether or not the environment is connected to the Internet. The second determination is a condition determination of whether or not the environment has a firewall.

In step S805, the inferring unit 315 executes the first determination to determine whether or not the environment is connected to the Internet. When the obtained information relating to the network is used and it is determined that any one of the conditions 1 to 4 is satisfied, it is determined that the environment is connected to the Internet. When none of the conditions 1 to 4 are satisfied, it is determined that the environment is not connected to the Internet. When it is determined that the environment is connected to the Internet, the processing proceeds to step S806. When it is determined that the environment is not connected to the Internet, the processing proceeds to step S809.

In step S809, the inferring unit 315 notifies the environment change detection unit 311 of the inference result to set the recommended type to the internet prohibited type.

In step S806, the inferring unit 315 executes the second determination to determine whether or not the environment has a firewall. Specifically, the inferring unit 315 determines whether or not condition 5 is satisfied using the obtained information relating to the network. In other words, when the proxy server address can be obtained, it is determined that the environment has a firewall, and when the proxy server address cannot be obtained from any of the sources for obtaining data, it is determined that the environment does not have a firewall. When it is determined that the environment does not have a firewall, the processing proceeds to step S807. When it is determined that the environment has a firewall, the processing proceeds to step S808.

In step S807, the inferring unit 315 notifies the environment change detection unit 311 of the inference result to set the recommended type to the company intranet type. Also, in step S808, the inferring unit 315 notifies the environment change detection unit 311 of the inference result to set the recommended type to the direct internet connection type.

When the environment change detection unit 311 receives the inference result from the inferring unit 315 in steps S807 to S809, the environment change detection unit 311 compares the categories of the use environment the MFP 101 is currently set to and the inference result (step S810). When the comparison result is different, the processing proceeds to step S811. When the comparison result is the same, the environment is not changed, and thus the series of processing ends.

In step S811, the environment change detection unit 311 notifies the rule setting unit 310 of the environment change detection and the inference result.

Via the processing described above, on the basis of the information relating to the network obtained from an external apparatus on the network or its own operation settings information, the inferring unit 315 can infer the category corresponding to the environment the MFP 101 is used in and use the inference result.

FIGS. 9A and 9B are diagrams illustrating examples of a settings screen and a notification screen for notifying the user that use the environment inference result. FIG. 9A is an example of a settings screen corresponding to FIG. 4C. FIG. 9B is an example of a notification screen corresponding to FIG. 5A. Note that this is an example of a notification method according to the present embodiment, but the method of notifying the user is not limited thereto.

The settings screen of FIG. 9A presents to the user the categories of the use environment recommended on the basis of the inference result in addition to a notification of a change in the use environment. Information 901 is information informing the user of the appropriate category to change to in light of the change in the use environment on the basis of the inference result. By selecting a category and touching the apply key, the currently set category is changed to the selected category. Note that the screen of FIG. 9A is displayed with the inferred category selected.

The notification screen of FIG. 9B notifies the user of the categories of the use environment recommended on the basis of the recommended result in addition to a notification of a change in the use environment. Also, the notification screen provides a way to change the settings on the basis of the notification result. Information 910 is information informing the user of the appropriate category to change to in light of the change in the use environment on the basis of the inference result. An apply settings button 911 is a button for setting the appropriate MFP 101 usage environment settings to the category corresponding to the use environment after a change based on the inference result. By the user pressing the apply settings button 911, use environment change can be performed with a single process without opening the settings screen. Also, by touching the "open recommended security settings" button, the screen of FIG. 9A is displayed.

Via the processing described above, on the basis of the inference processing, a change in the category corresponding to the use environment can be detected and the inference processing can be used to notify the user. In this manner, the user can easily set the category of the post-change environment without knowledge thereof and without checking.

Modified Examples

In the first and second embodiments, a method of detecting a change in the category corresponding to the environment is described. However, in an embodiment in which only notification is performed, when there is a possibility that a change is required to a category needing stronger security measures, the information processing apparatus may continuously operate in a state exposed to security risks. By applying the category settings with the strongest security measures, measures can be provided to counter the security risks. Specifically, in the case of the first and second embodiments, when the user is notified of the detection result, the category is also changed to the direct internet connection type.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-020795, filed Feb. 14, 2022 which is hereby incorporated by reference herein in its entirety.

What is claimed is:

1. An image processing apparatus comprising:
   at least one processor; and
   at least one memory including at least one program,
   wherein the at least one program causes the at least one processor to perform:
      setting a first security setting for the image processing apparatus as a security setting of the image processing apparatus,
      monitoring packets transmitted and received by the image processing apparatus, and
      providing a notification relating to a need to change the security setting when a packet with a result from monitoring via the monitoring matching a predetermined condition is found; and
   wherein the predetermined condition is associated with the first security setting.

2. The image processing apparatus according to claim 1, wherein the setting sets, as the security setting, the first security setting suitable for a network type corresponding to a selection by a user from a plurality of network types.

3. The image processing apparatus according to claim 2, wherein the plurality of network types includes an internet prohibited type, a direct internet connection type, and an intranet type.

4. The image processing apparatus according to claim 3, wherein the providing includes
   setting a packet with a global IP address for a transmission source or a destination as a packet matching the predetermined condition when the network type is an internet prohibited type.

5. The image processing apparatus according to claim 1, wherein the at least one program further causes the at least one processor to perform specifying a current network type in a usage environment of the image processing apparatus, and
   wherein the specifying specifies a current network type by finding a packet with a result from monitoring via the monitoring matching a predetermined condition.

6. The image processing apparatus according to claim 5, wherein the providing provides information prompting for a setting change to a second security setting appropriate for a current network type specified via the specifying as the notification.

7. The image processing apparatus according to claim 5, wherein the providing further provides information indicating a current network type specified via the specifying.

8. The image processing apparatus according to claim 5, wherein the specifying obtains information relating to a network to which the image processing apparatus is connected,
   wherein when the information indicates an environment connected to an Internet and a proxy server is set, an intranet is specified as a current network type,
   wherein when the information indicates an environment connected to an Internet and a proxy server is not set, a direct internet connection is specified as a current network type, and wherein when the information does not indicate an environment connected to an Internet, Internet prohibited is specified as a current network type.

9. The image processing apparatus according to claim 5, wherein the providing further provides a screen for receiving an instruction for changing to a second security setting suitable for a specified current network type.

10. The image processing apparatus according to claim 1, wherein the providing provides a notification relating to a need to change the security setting when a packet with a log of a packet transmitted and received by the image processing apparatus matches a predetermined condition is found.

11. The image processing apparatus according to claim 1, wherein the providing provides a notification relating to a need to change the security setting when a packet filtered using the first security setting matching the predetermined condition is found.

12. The image processing apparatus according to claim 1, wherein the providing provides the notification via a display on an operation unit of the image processing apparatus.

13. A non-transitory computer-readable medium storing at least one program,
wherein, when the at least one program is executed by at least one processor, the at least one program causes the at least one processor to set a first security setting for an image processing apparatus as a security setting of the image processing apparatus, monitor packets transmitted and received by the image processing apparatus, and provide a notification relating to a need to change the security setting when a packet with a result from the monitoring matching a predetermined condition is found; and wherein the predetermined condition is associated with the first security setting.

14. A method executed by an image processing apparatus comprising:

setting a first security setting for the image processing apparatus as a security setting of the image processing apparatus;

monitoring packets transmitted and received by the image processing apparatus; and providing a notification relating to a need to change the security setting when a packet with a result from the monitoring matching a predetermined condition is found, wherein the predetermined condition is associated with the first security setting.

* * * * *